Figure 1:
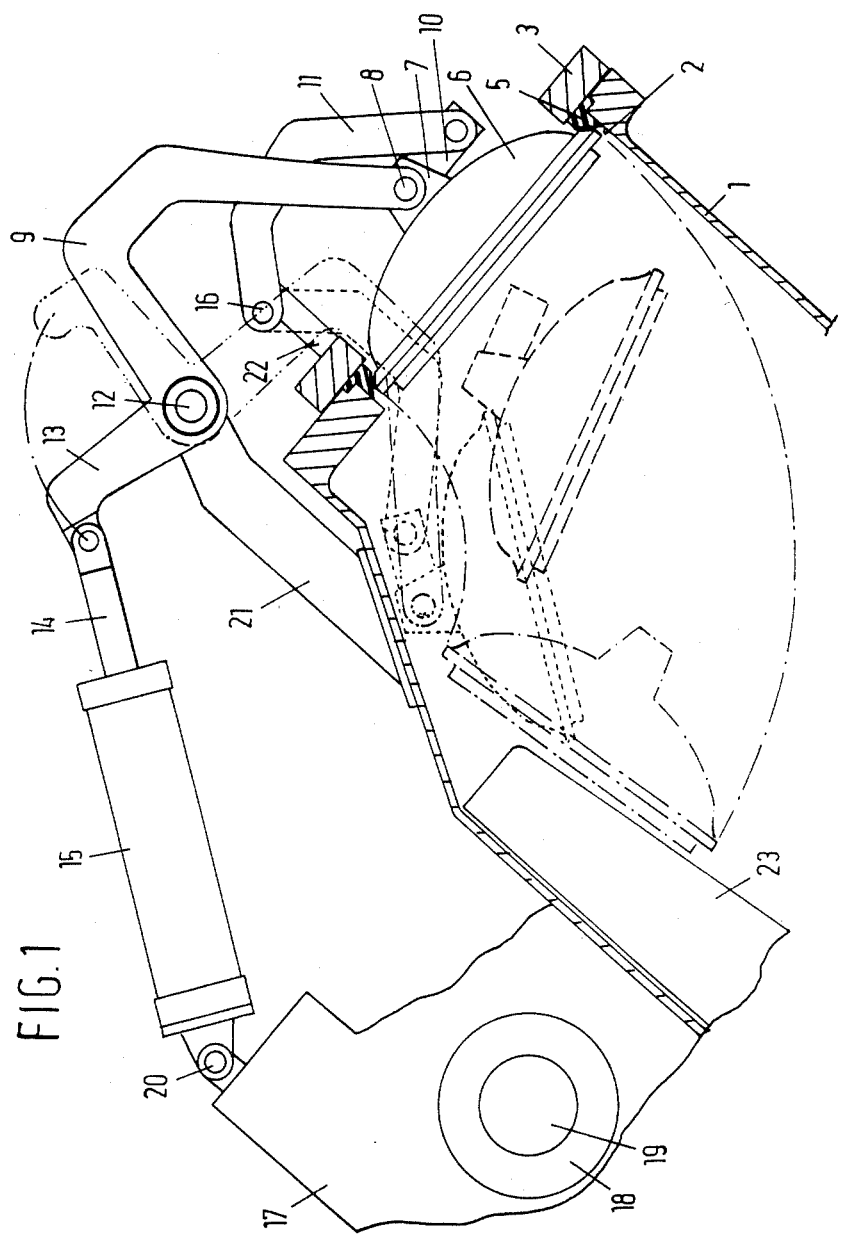

United States Patent [19]
van der Schoot

[11] Patent Number: 4,566,375
[45] Date of Patent: Jan. 28, 1986

[54] COVER CONSTRUCTION FOR A STEAM PEELING APPARATUS

[75] Inventor: Peter W. C. van der Schoot, Groot Ammers, Netherlands

[73] Assignee: Goudsche Machinefabriek B.V., Gouda, Netherlands

[21] Appl. No.: 670,247

[22] Filed: Nov. 9, 1984

[30] Foreign Application Priority Data

Nov. 10, 1983 [NL] Netherlands ............ 8303867

[51] Int. Cl.$^4$ .............. A23N 7/00; B65D 43/14
[52] U.S. Cl. ............................. 99/348; 99/483; 99/584; 220/211; 220/314; 220/316; 220/333
[58] Field of Search ............ 99/348, 410, 356, 359, 99/584, 483, 467, 469–471, 516, 539, 540, 629–634; 426/482; 220/333, 314, 316, 335, 211, 244

[56] References Cited

U.S. PATENT DOCUMENTS 4,324,344  4/1982  Kunz ......................... 220/211 X
4,393,756  7/1983  van der Schoot .............. 99/483 X Primary Examiner—Timothy F. Simone
Attorney, Agent, or Firm—Sprung Horn Kramer & Woods

[57] ABSTRACT

A steam peeling or boiling apparatus for crops, such as potatoes, carrots, celery, apples and the like, or for meat, comprising a substantially cylindrical peeling vessel arranged for rotation around horizontal stub shafts, having a supply and discharge opening disposed eccentrically or non-eccentrically in one of the end faces. The opening is closable by an inwardly movable cover operated by a lever rotatably connected thereto, the other end of which is rotatably connected to the exterior of the vessel. The cover is provided with a second operating lever by means of which the cover can be displaced along the inner wall of the vessel in entirely "controlled" fashion. The second operating lever is rotatably connected to the exterior of the vessel at a location situated in the perpendicular median plane between the initial and final positions of the cover pivot of the second operating lever.

3 Claims, 2 Drawing Figures

COVER CONSTRUCTION FOR A STEAM PEELING APPARATUS

The invention relates to a steam peeling or boiling apparatus for crops, such as potatoes, carrots, celery, apples and the like or for meat, comprising a substantially cylindrical peeling vessel arranged for rotation around horizontal stub shafts, having a supply and discharge opening disposed eccentrically or non-eccentrically in one of the end faces, said opening being closable by an inwardly movable cover operated by a lever rotatably connected thereto, the other end of which is rotatably connected to the exterior of the vessel.

Such an apparatus, based on Dutch patent application No. 78.12678, has been marketed by applicants for a number of years. A drawback of this prior art apparatus is that the cover, all points of which describe a circular arc in principle during opening and closing, has a path of travel requiring too much space, so that either product is scooped up and the cover and seat are contaminated or the degree of filling of the vessel has to be kept low. Moreover, a wedge shape is produced during the closing movement of the cover between the cover and the respective wall of the vessel, so that there is a chance that wood or the like is clamped therebetween, thereby damaging the cover or the seat.

It is an object of the invention to eliminate the above drawbacks.

To this end, a peeling apparatus of the above described type is characterized in that the cover is fitted with a second operating lever by means of which the cover can be displaced along the inner wall of the vessel in entirely "controlled" fashion.

The second operating lever is rotatably connected to the exterior of the vessel at a location situated in the perpendicular median plane between the initial and final positions of the cover pivot of the second operating lever.

Furthermore, the second operating lever may be rotatably connected to an intermediate rod affixed itself to the cover. Instead of the intermediate rod, use can be made of a second lug or lugs affixed to the cover.

This arrangement permits to obtain the contemplated path of travel in a simple manner.

Figure 2:
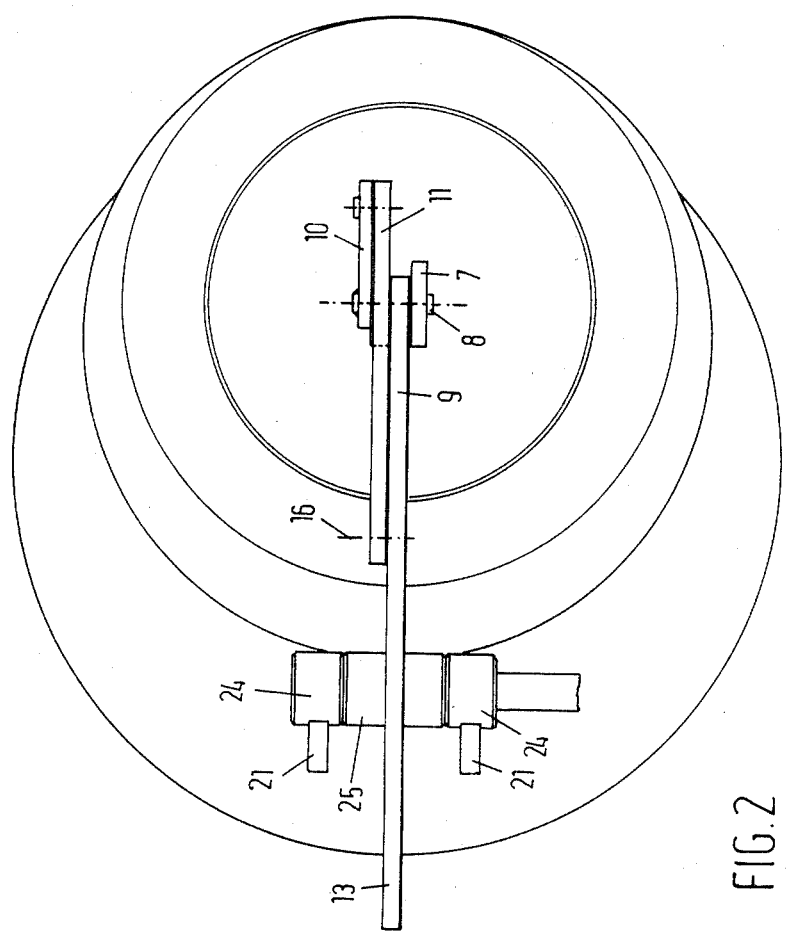

One embodiment of the cover construction for a steam peeling apparatus according to the invention will now be described, by way of example, with reference to the accompanying drawings, in which:

FIG. 1 is a diagrammatic part-cross-sectional view of a part of a steam peeling apparatus having a cover construction according to the invention and FIG. 2 is a diagrammatic top view of a part of the apparatus shown in FIG. 1.

It is observed that FIG. 1 shows in addition to the construction according to the invention, by chain-dotted lines, the path of travel and the final position of the cover of the prior art apparatus.

As shown in the drawings, a steam peeling apparatus according to the invention comprises a peeling vessel 1 fitted with a filling hole 2. In the peeling vessel there is shown a mixing arm 23 (see also Dutch patent application 78.12678). A sealing ring 5 is mounted in the filling hole by means of a ring 3. The hole is closable by a cover 6, the top of which is fitted with two lugs 7. Through the lugs there extends a shaft 8 by means of which a first operating lever 9 is rotatably connected to the cover. An intermediate rod 10 affixed to the cover is rotatably connected to a second operating lever 11. Instead of the intermediate rod 10, use can be made of a second set of lugs on the cover.

The first operating lever 9, of which the end not mentioned yet is rotatably connected to a shaft 12 affixed to the peeling vessel by means of supporting arms 21, has a rearward extension 13 connected to a piston rod 14 of an operating cylinder 15. It is observed that the free ends of the supporting arms are fitted with hubs or bushes 24 between which there is received a bush 25 for supporting the lever 9/13.

The end of the second operating lever 11 situated opposite the intermediate rod 10 is rotatably connected to a shaft 16, which is affixed to the vessel 1 or the ring 3 by means of a support 22.

As further shown in the drawings, the peeling vessel is provided with attachment lugs 17 having a hub 18 for accommodating a shaft 19 about which the peeling vessel can be rotated. The above cylinder 15 is likewise rotatably attached to said lugs by means of a shaft 20.

As appears from a comparison between the dotted path of travel of the cover according to the invention and the chain-dotted path of travel of the prior art apparatus, the construction according to the invention allows a substantially higher degree of filling of the peeling vessel, and moreover, avoids all drawbacks going with the prior art construction, as described in the introduction hereinbefore.

I claim:

1. In a steam peeling or boiling apparatus for crops, such as potatoes, carrots, celery, apples and the like, or for meat, comprising a substantially cylindrical peeling vessel arranged for rotation around horizontal stub shafts, having a supply and discharge opening disposed eccentrically or non-eccentrically in one of the end faces, said opening being closable by an inwardly movable cover and means for moving the cover between a closed position and an open position inside the vessel including a first lever rotatably connected at one end to the cover and rotatably connected at the other to the exterior of the vessel, the improvement wherein the means for moving the cover further comprises a second operating lever connected to the cover and co-active with the first lever to displace the cover along the inner wall of the vessel during movement between the open and closed positions.

2. A steam peeling apparatus according to claim 1, wherein the second operating lever is rotatably connected to the exterior of the vessel at a location situated in the perpendicular median plane between initial and final positions of the cover pivot of the second operating lever.

3. A steam peeling apparatus according to claim 1 or 2, wherein the second operating lever is rotatably connected to an intermediate rod affixed to the cover.

* * * * *